(12) United States Patent
Werner et al.

(10) Patent No.: US 10,425,270 B2
(45) Date of Patent: Sep. 24, 2019

(54) CONTROL OF TIMING FOR MIXED-MODE MULTICARRIER MODULATION

(71) Applicant: Telefonaktiebolaget L M Ericsson (publ), Stockholm (SE)

(72) Inventors: Karl Werner, Segeltorp (SE); Robert Baldemair, Solna (SE); Håkan Björkegren, Täby (SE); Erik Dahlman, Stockholm (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 339 days.

(21) Appl. No.: 14/910,286

(22) PCT Filed: Nov. 17, 2015

(86) PCT No.: PCT/SE2015/051236
§ 371 (c)(1),
(2) Date: Feb. 5, 2016

(87) PCT Pub. No.: WO2016/209139
PCT Pub. Date: Dec. 29, 2016

(65) Prior Publication Data
US 2017/0163463 A1    Jun. 8, 2017

Related U.S. Application Data

(60) Provisional application No. 62/182,952, filed on Jun. 22, 2015.

(51) Int. Cl.
*H04L 27/32*    (2006.01)
*H04L 5/00*    (2006.01)
(Continued)

(52) U.S. Cl.
CPC ............ *H04L 27/32* (2013.01); *H04L 5/0007* (2013.01); *H04L 5/0023* (2013.01);
(Continued)

(58) Field of Classification Search
CPC ... H04L 27/32; H04L 5/0055; H04L 27/2692; H04L 27/10; H04L 27/34; H04L 27/18;
(Continued)

(56) References Cited

U.S. PATENT DOCUMENTS 7,944,996 B2 *   5/2011   Tsukio ..................... H04L 1/20
                                                                    370/206
2005/0053169 A1 *   3/2005   Jia ....................... H04B 7/0417
                                                                    375/267
(Continued)

FOREIGN PATENT DOCUMENTS

CN    101286787 A    10/2008
EP    1914918 A1    4/2008
(Continued)

OTHER PUBLICATIONS

Smee, John E., "5G Design Across Services", Qualcomm Technologies, Inc., May 2015, 1-23.
(Continued)

*Primary Examiner* — David C Payne
*Assistant Examiner* — Sarah Hassan
(74) *Attorney, Agent, or Firm* — Murphy, Bilak & Homiller, PLLC

(57) ABSTRACT

In one aspect, a wireless transmitter forms (1110) a first signal having a first integer number of symbol intervals in each of one or more time intervals of a predetermined length and forms (1120) a second signal having a second integer number of symbol intervals in each of the one or more time intervals of the predetermined length, the second integer number differing from the first integer number. The wireless (Continued)

transmitter simultaneously transmits (1130) the first and second signals in a frequency band, such that the first and second signals are frequency-domain multiplexed in the frequency band and such that a symbol interval starting time in the first signal is aligned with a corresponding symbol interval starting time in the second signal at least once per time interval.

30 Claims, 14 Drawing Sheets

(51) Int. Cl.
| | | |
|---|---|---|
| *H04L 27/26* | (2006.01) | |
| *H04L 27/02* | (2006.01) | |
| *H04L 12/931* | (2013.01) | |
| *H04L 5/14* | (2006.01) | |
| *H04L 27/14* | (2006.01) | |

(52) U.S. Cl.
CPC ............ *H04L 5/0039* (2013.01); *H04L 5/14* (2013.01); *H04L 27/02* (2013.01); *H04L 27/14* (2013.01); *H04L 27/26* (2013.01); *H04L 27/2602* (2013.01); *H04L 27/2607* (2013.01); *H04L 49/00* (2013.01)

(58) Field of Classification Search
CPC ... H04L 27/12; H04L 27/2647; H04L 1/0079; H04L 27/362; H04L 5/0053; H04L 27/2601; H04L 5/0007; H04L 27/20; H04L 5/0016; H04L 5/0046; H04L 1/0083; H04L 2025/03414; H04L 5/0044
USPC ........................................................ 375/276
See application file for complete search history.

(56) References Cited

U.S. PATENT DOCUMENTS

| | | | | |
|---|---|---|---|---|
| 2007/0248113 | A1* | 10/2007 | Ko | ........................ H04B 7/0613 370/436 |
| 2008/0304584 | A1* | 12/2008 | Nishio | .................. H04L 1/0013 375/260 |
| 2011/0051666 | A1 | 3/2011 | Kim et al. | |
| 2011/0216776 | A1 | 9/2011 | Barr et al. | |
| 2011/0268135 | A1* | 11/2011 | Kim | .................... H04L 27/2607 370/474 |
| 2016/0301556 | A1* | 10/2016 | Nory | ..................... H04L 5/0053 |

FOREIGN PATENT DOCUMENTS

| | | |
|---|---|---|
| JP | 2012507719 A | 3/2012 |
| JP | 2013013122 A | 1/2013 |
| WO | 2006011524 A1 | 2/2006 |
| WO | 2009023799 A3 | 5/2009 |
| WO | 2015038621 A1 | 3/2015 |
| WO | 2015099889 A1 | 7/2015 |
| WO | 2016155531 A1 | 10/2016 |
| WO | 2016192644 A1 | 12/2016 |

OTHER PUBLICATIONS

Unknown, Author, "Implementing OFDM Modulation for Wireless Communications", Altera, Application Note 503, version 1.0, Jan. 2008, 1-18.

Smee, John E., "5G Design Across Services", Qualcomm Technologies, Inc., 2015, 1-23.

* cited by examiner

CONTROL OF TIMING FOR MIXED-MODE MULTICARRIER MODULATION

TECHNICAL FIELD

The present invention generally relates to wireless communication networks, and particularly relates to multi-mode multicarrier configurations.

BACKGROUND

The so-called Long Term Evolution (LTE) wireless communication networks developed by members of the 3$^{rd}$-Generation Partnership Project (3GPP) use orthogonal frequency-division multiplexing (OFDM) in the downlink and Discrete Fourier Transform spread (DFT-spread) OFDM (also referred to as single-carrier frequency-division multiple access, or FDMA) in the uplink. The basic LTE downlink physical resource can thus be seen as a time-frequency grid as illustrated in FIG. 1, where each resource element corresponds to one OFDM subcarrier during one OFDM symbol interval. The uplink subframe has the same subcarrier spacing as the downlink, where the subcarrier spacing is the difference in frequency between the center of one subcarrier and the center of an immediately adjacent subcarrier. The uplink subframe has the same number of single-carrier FDMA (SC-FDMA) symbols in the time domain as OFDM symbols in the downlink—in other words, the symbol durations are the same for both the OFDM downlink and the SC-FDMA uplink.

In the time domain, LTE downlink transmissions are organized into radio frames of ten milliseconds, each radio frame consisting of ten equally-sized subframes of length $T_{subframe}=1$ milliseconds, as shown in FIG. 2. For normal cyclic prefix, one subframe consists of fourteen OFDM symbols. The duration of each symbol, i.e., the symbol interval, is approximately 71.4 microseconds (μs).

Furthermore, the resource allocation in LTE is typically described in terms of resource blocks, where a resource block corresponds to one slot (0.5 milliseconds) in the time domain and twelve contiguous subcarriers in the frequency domain. A pair of two adjacent resource blocks in time (1.0 milliseconds) is known as a resource block pair. Resource blocks are numbered in the frequency domain, starting with 0 from one end of the system bandwidth.

Downlink transmissions are dynamically scheduled, in that in each subframe the base station transmits control information about which terminals data is transmitted to and upon which resource blocks the data is transmitted, in the current downlink subframe. This control signaling is typically transmitted in the first 1, 2, 3 or 4 OFDM symbols in each subframe. This number n=1, 2, 3 or 4 is known as the Control Format Indicator (CFI) and is broadcast by the base station, in the first OFDM symbol interval of each downlink subframe. The downlink subframe also contains common reference symbols, which are known to the receiver and used for coherent demodulation of the control information. A downlink system with CFI=3 OFDM symbols as control is illustrated in FIG. 3.

The reference symbols shown in FIG. 3 are the cell specific reference symbols (CRS), and are used to support multiple functions including fine time and frequency synchronization and channel estimation for certain transmission modes.

While the development and deployment of LTE networks provides users with greatly increased wireless data rates and has enabled the development of a wide variety of mobile broadband (MBB) services, demand for these services continues to grow. In addition to this increased demand for improved bandwidth and performance, new applications for special-purpose devices, such as machine-to-machine (M2M) devices, continue to be developed. These market forces indicate that a wireless communications technology with improved flexibility is needed, to better match the variety of service requirements for mobile data applications.

SUMMARY

In an OFDM-based radio access scheme, narrow and relatively wider subcarriers favor different types of services. The current LTE standard uses fixed subcarrier spacing and, therefore, is relatively inflexible when it comes to satisfying highly varying quality-of-service (QoS) requirements. This is particularly true with respect to time-critical services. A new physical layer design, details of which are disclosed below, uses smaller and variable sized subframes with its mixed mode operation. Also disclosed are methods and apparatus for utilizing the scalability defined for this new physical layer in such a way that flexibly accommodates the requirements of differing applications.

In one aspect of the techniques described herein, a wireless transmitter forms a first signal having a first integer number of symbol intervals in each of one or more time intervals of a predetermined length and forms a second signal having a second integer number of symbol intervals in each of the one or more time intervals of the predetermined length, the second integer number differing from the first integer number. The wireless transmitter simultaneously transmits the first and second signals in a frequency band, such that the first and second signals are frequency-domain multiplexed in the frequency band and such that a symbol interval starting time in the first signal is aligned with a corresponding symbol interval starting time in the second signal at least once per time interval.

In another aspect of the techniques described herein, a wireless receiver receives a radio frequency signal in a frequency band and recovers, from the received radio frequency signal, a first signal having a first integer number of symbol intervals in each of one or more time intervals of a predetermined length. The wireless receiver further recovers, from the received radio frequency signal, a second signal having a second integer number of symbol intervals in each of the one or more time intervals of the predetermined length, the second integer number differing from the first integer number. The first and second signals processed by the wireless receiver are frequency-domain multiplexed in the frequency band and overlap in time by at least one of the time intervals, and a symbol interval starting time in the first signal is aligned with a corresponding symbol interval starting time in the second signal at least once per time interval.

Various methods and apparatus corresponding to the above aspects are detailed herein, as are additional details and refinements of these aspects. Of course, the present invention is not limited to the above features and advantages. Those of ordinary skill in the art will recognize additional features and advantages upon reading the following detailed description, and upon viewing the accompanying drawings.

DETAILED DESCRIPTION

Figure 1:
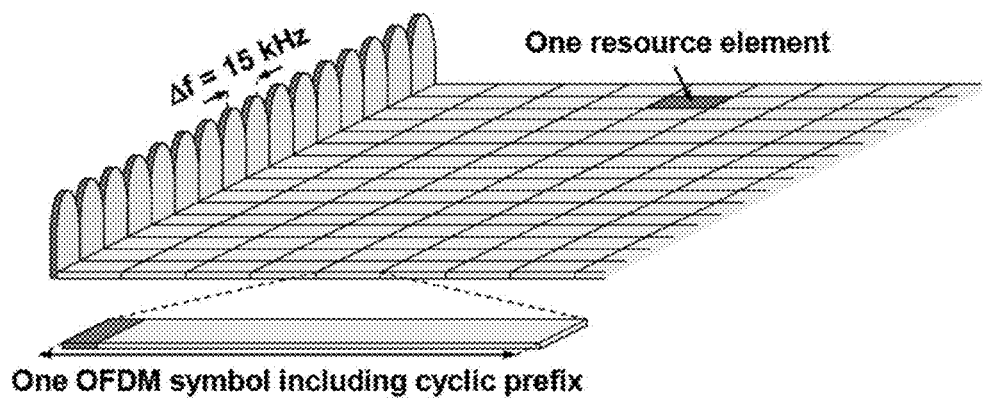
FIG. 1 illustrates a diagram illustrating an LTE downlink physical resource, according to some embodiments.
Figure 2:
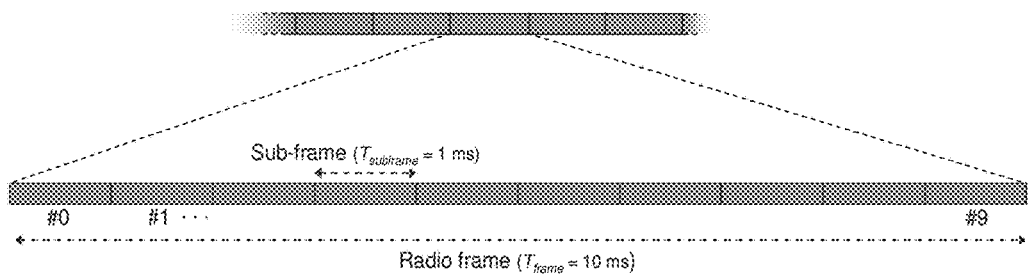
FIG. 2 illustrates a diagram of an LTE time-domain structure, according to some embodiments.
Figure 3:
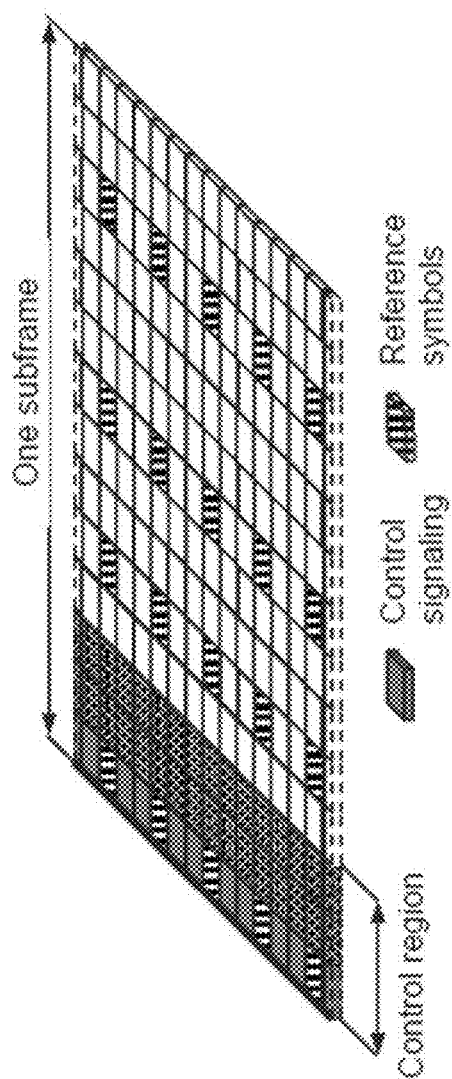
FIG. 3 illustrates a diagram of a downlink subframe, according to some embodiments.

There has been a rapid growth in the number of wireless devices and applications in recent years, and this trend is highly likely to continue in the future. This growth signals a need for a new radio access technology (RAT), which may be regarded as a "5G" (5th-generation) wireless technology. One of the key goals of the current plans for 5G is to expand services offered by the network beyond mobile broadband (MBB). New use cases may come with new requirements. At the same time, 5G should also support a very wide frequency range and be very flexible when it comes to deployment options.

With the emergence of new applications with highly varying application needs, i.e., quality-of-service (QoS) parameters and deployment scenarios, a single, inflexible, physical-layer technology is not adequate to achieve the desired performance characteristics. In particular, for example, it is clear that some services require a shorter transmission-time interval (TTI), compared to that provided by systems compliant with the current specifications for LTE, in order to reduce latency. In an OFDM system, shorter TTIs may be realized by changing subcarrier spacing. Other services, however, need support of relaxed synchronization requirements or very high robustness to delay spread—this may be done, in a system operating with cyclic prefix, by extending the cyclic prefix. These are just examples of possible requirements.

It is clear, however, that selecting OFDM parameters such as subcarrier spacing and cyclic prefix lengths is a tradeoff between conflicting goals. This suggests that the next generation, or "5G," radio access technology must provide flexible support for several variants of transmission parameters, commonly called "numerologies." Such transmission parameters might be symbol duration, i.e., the length of an OFDM symbol interval, which directly relates to subcarrier spacing in an OFDM system and in several other multicarrier modulation systems. Another transmission parameter that might be flexibly specified with these multiple numerologies is the cyclic prefix duration, i.e., the length of that portion of the OFDM symbol interval that is allocated to a cyclic prefix.

Furthermore, it is beneficial to be able to simultaneously support several services on the same band. This allows for a dynamic allocation of resources, such as bandwidth, between the different services, and for efficient implementation and deployment. This in turn leads to a need for the simultaneous use of multiple numerologies on the same band. Note that the term "band" is used here to denote a carrier or a set of frequency-adjacent carriers used by a radio access network. This is the starting point for the detailed techniques described herein.

In this context, a highly flexible physical layer for a future generation of cellular networks is currently being designed. This new physical layer design is geared towards fulfilling a wide range of varying QoS requirements, including latency, reliability and throughput. In this new physical layer design, scalability of the physical layer to varying requirements is proposed to be achieved using different subcarrier spacings. Another feature is that it should support mixed-mode operation, which allows different subcarrier spacings to simultaneously coexist within the same frequency band.

The essence of mixed-mode operation as that term is used herein is as follows: At a transmitting node, two or more multicarrier signals are generated, each being composed of one or more symbols, but with the multicarrier signals having different parameters with respect to subcarrier spacing, and/or symbol duration, and/or cyclic prefix length. In particular, the symbol durations for the two signals (and other parameters for the signals) are selected so that symbol borders align periodically, even though the symbol durations for the two signals may vary. In some embodiments, alignment is achieved with a 1 millisecond periodicity—this provides a good match to existing LTE techniques, so that LTE signals can be combined, in the same frequency band, with one or more other multicarrier signals having different subcarrier spacings and/or symbol durations.

Thus, in future networks (broadly referred to as "5G" networks), multi-mode multicarrier configuration is envisioned to meet the varying QoS requirements of different applications and services. This approach would support different subcarrier spacings (or, correspondingly, different OFDM symbol sizes), which could be defined in a way such that different OFDM symbol lengths fit together very well, so as to facilitate inter-operability of different OFDM configurations. Each combination of subcarrier spacing, OFDM symbol duration, and cyclic prefix may be referred to as a "numerology."

One problem with having several numerologies, i.e., several subcarrier spacings and/or OFDM symbol sizes, in simultaneous use on different parts of the band is that certain "system functions" will have impact on several of the parts of the band. One such system function is duplex direction switching—this needs to apply to all parts of the band, and must therefore be compatible with all numerologies in use. A second system function is Radio Resource Management (RRM)—to fully reap the benefit of sharing the resources, RRM needs to act on all parts of the band. A third system function is receiver time alignment.

These system functions require action that is synchronized across the band. However, if such action is not aligned with symbol boundaries of all affected parts of the band, performance degradation would also occur.

The techniques and apparatus detailed herein thus address a system designed to simultaneously transmit multiple multicarrier signals, the multiple signals having different numerologies. The multiple signals are frequency-domain multiplexed. Each signal is a sequence of one or more symbols (for example OFDM symbols) and also other transmissions (for example cyclic prefixes). The described techniques enable periodic alignment of the symbol start- and end-times (symbol boundaries). This is achieved by selecting the numerology of the two or more signals according to the invention. The time instants where periodic alignment happens are possible points for changing duplex direction or performing other "system function" actions.

Even though several of the specific examples provided herein are based on the use of OFDM as the base multicarrier modulation scheme, the techniques applies equally well if some or all of the signals are precoded OFDM transmissions, such as Discrete Fourier Transform Spread OFDM (DFTS-OFDM), which is also known as single-carrier frequency-division multiple access (SC-FDMA). It will be appreciated that the term "multicarrier modulation," as used herein, refers to any of these schemes as well as to other multicarrier modulation schemes in which data is transmitted by splitting it into several components and sending each of these components over separate carrier signals within a frequency band. (These separate carrier signals are commonly referred to as "subcarriers.") Thus, references herein to different multicarrier modulation schemes may refer to differences in the underlying modulation technique, or to differences in the multicarrier modulation parameters (e.g., symbol duration and/or subcarrier spacings), or both.

The techniques described herein pertain to a system that, for reasons described above, is configured to transmit multiple multicarrier signals simultaneously, the signals having different multicarrier modulation parameters (numerologies), e.g., with respect to symbol length, subcarrier spacing, etc. Each signal consists of a sequence of symbols (for example OFDM symbols) and guard periods (for example cyclic prefixes or guard periods consisting of zeros).

For simplicity of exposition, the following discussion will refer to signal_1 and signal_2. It should be readily understood that extension of the described techniques to N>2 signals may be done in a straightforward manner.

Category 1 Techniques—Constant Cyclic Prefix Durations

Denote the duration of each of the symbols in signal_n by Tsymb_n and the duration of the cyclic prefixes of signal_n by Tcp_n. According to some embodiments of the disclosed techniques, the symbol duration and cyclic prefix duration are selected, for at least two of the signals, in such a way that:

$$X(Tcp\_1+Tsymb\_1)=Y(Tcp\_2+Tsymb\_2)=T,$$

where X and Y are integer numbers. Generally, X and Y are selected so that T is sufficiently short, e.g., so as to provide a reasonable interval for time-division duplexing (TDD) switching, or so as to provide a convenient periodicity for transmitting reference signals or synchronization signals.

The above may also be expressed as follows: The parameters of signal_1 and signal_2 are selected so that an integer number of symbols (and in some embodiments guard intervals) of each of the two signals fit into a given time interval. This creates periodic alignment between boundaries of symbols of the two signals.

Example 1

In some embodiments, T is expressed as 1/Z ms where Z is an integer. This allows convenient co-existence with LTE.

Example 2

Symbol durations may be chosen such that (fs=9/8*30.72 MHz).

Table 1, below, lists symbol durations and cyclic prefix lengths for each member in an example set of numerologies n=1 ... 11, for a given sampling frequency fs. All or a subset of these numerologies may be used in a system operating according to the presently disclosed techniques, such that any two or more of these numerologies may be applied simultaneously, with the simultaneously applied modulation schemes aligned in such a way that there is a periodic alignment between boundaries of symbols of the two modulated signals.

TABLE 1

|  | $T_{symb\_n}$ | $T_{cp\_n}$ |
| --- | --- | --- |
| n = 1 | 2048/fs s | 112/fs s |
| n = 2 | 2048/fs s | 832/fs s |
| n = 3 | 2048/(4*fs) s | 112/(4*fs) s |
| n = 4 | 2048/(4*fs) s | 832/(4*fs) s |
| n = 5 | 6144/fs s | 1304/fs s |
| n = 6 | 512/fs s | 28/fs s |
| n = 7 | 512/fs s | 208/fs s |
| n = 8 | 256/(4*fs) s | 14/(4*fs) s |
| n = 9 | 256/(4*fs) s | 104/(4*fs) s |
| n = 10 | 2048/(32*fs) | 112/(32*fs) s |
| n = 11 | 2048/(32*fs) s | 208/(32*fs) s |

Example 3

T being sufficiently low may mean that T is the shortest time the terminal may transmit in a single duplex direction. T may also be the periodicity of the transmission of a certain sequence in any of the signals—for example a reference signal sequence or a sequence intended for synchronization or beam-finding.

Category 2 Techniques—Alignment with Varying Length of Cyclic Prefixes

It should be noted that the general technique in this category may be regarded as a generalization of the category 1 technique. Denote the duration of the cyclic prefix of symbol m of signal n by Tcp_n(m). According to some embodiments according to this category 2 of techniques, symbol and cyclic prefix durations of signal 1 and 2 are selected so that:

$$\Sigma_{x=0}^{X-1} Tcp\_1(x+K)+Tsymb\_1)=\Sigma_{y=0}^{Y-1}(Tcp\_2(y+L)+Tsymb\_2)=T,$$

with K, L being arbitrary integers. K and L could be zero.

Example 4—Varying Cyclic Prefixes

Table 2 illustrates an example set of cyclic prefixes for seven symbols that fall within an interval T. In this example, the symbol duration is constant among the seven symbols, at 2048 sample times (1/fs). The cyclic prefixes vary according to a predetermined pattern, such that the first four symbols in a given interval T have cyclic prefixes that are 424 sample times long, while the following three symbols have cyclic prefixes of 416 sample times. In this example, T=2048*7+424*4+416*3=17280/fs s. Given a sample clock of 30.52 MHz, for example, T=562.5 microseconds.

TABLE 2

| | Tsymb_n | Tcp_n(m), [m = 1, m = 2 . . . ] |
|---|---|---|
| n = 2 | 2048/fs s | x(m)/fs s, x(m) = [424, 424, 424, 424, 416, 416, 416] |

Duplex Direction Switches Aligned with Periodicity of Symbol Alignment

In some embodiments, a network node is configured so that duplex direction switches, i.e., the transition between transmission/reception in a first direction to transmission/reception in a second direction, occur at time instants defined by T, where the applied multicarrier modulation numerologies have symbol timings such that symbols in the modulated signals align at intervals of T. Given that a switch occurs at T0, then subsequent switches can only occur at T0+ZT with Z being an integer.

Generation and Multiplexing of Signal 1 and Signal 2

Figure 10:
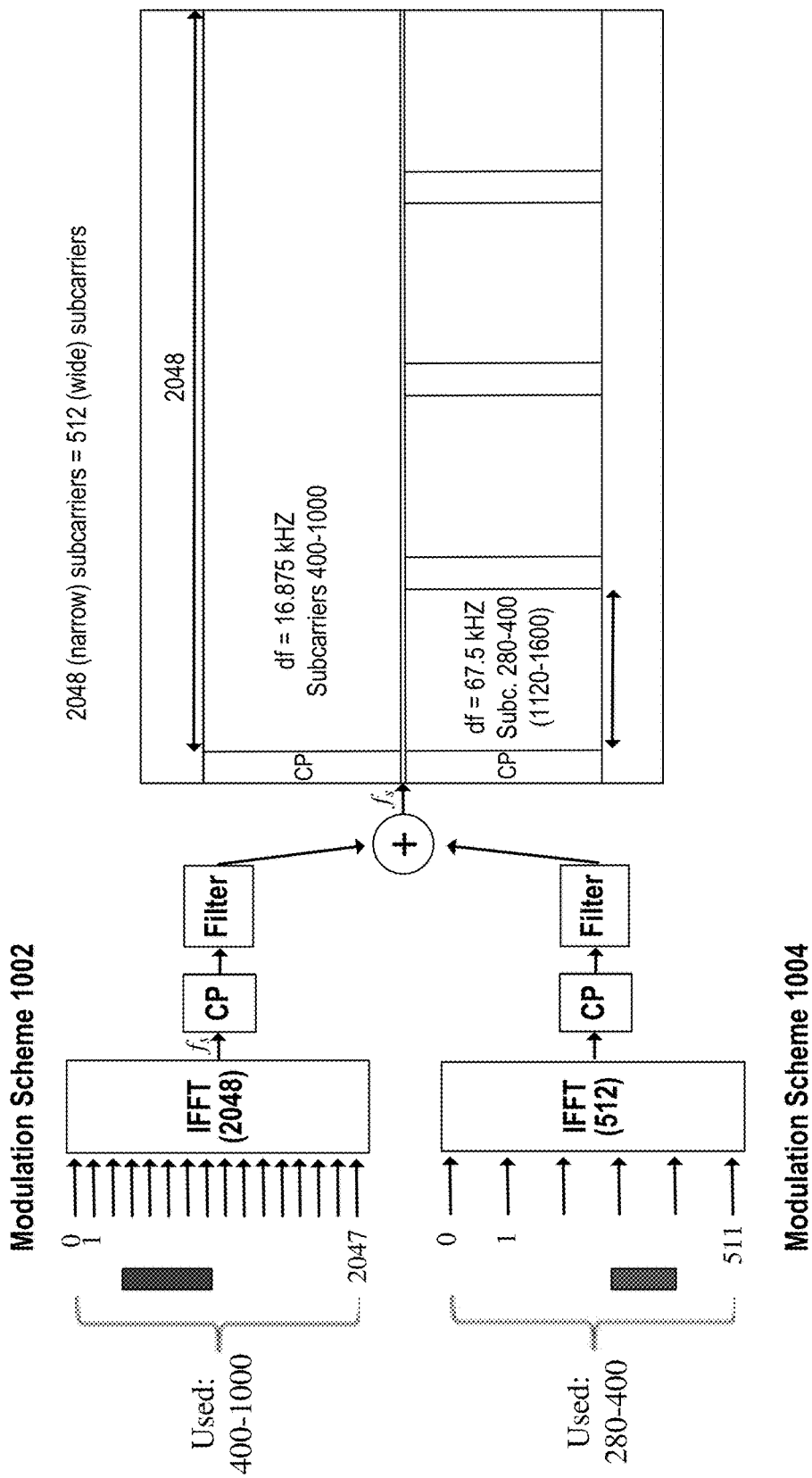
FIG. 10 illustrates signal generation using multiple IFFT modulation schemes in each time interval, according to some embodiments.

When OFDM or a related multicarrier modulation technique is used, the two signals signal_1 and signal_2 may be generated using an inverse fast-Fourier transform (IFFT) or, somewhat more generally, an inverse discrete Fourier transform (IDFT). Zeros are inserted in the signal prior to the IFFT of signal_1 to match the bandwidth of signal_2. Zeros are inserted in the signal prior to the IFFT of signal_2 to match the bandwidth of signal_1. Signal_1 is passed through an IFFT and filter, signal_2 is also passed through an IFFT and filter. Signals are then superimposed (added). FIG. 10, which is discussed in detail below, illustrates an example of a signal generation procedure involving two multicarrier modulation schemes, the first one having a subcarrier spacing of 16.875 kHz and the second one having a subcarrier spacing of four times that, i.e., 67.5 kHz. As seen in that figure, the second modulation scheme has symbol durations that are one-fourth those of the first modulation scheme, and the symbols are aligned at each fourth symbol.

For ease of implementation, it may in some cases be advantageous to add guardbands between different signals. In that case some of the bandwidth is sacrificed by inserting additional zeros between signals, such that a group of subcarriers is carrying no signal energy. This relaxes the requirements on the filters used to separate the signals in both the transmitter and receivers. In the example of FIG. 10, there is a guardband of 119 narrow subcarriers, or about 2 MHz.

Different Possibilities for Superposition of Signal 1 and Signal 2

In the example shown in FIG. 10, the two modulated signals are superimposed in the time domain—the details of the conversion of the signal or signals to the analog domain and the upconversion of the combined signal are omitted, but are well known to those familiar with the design of OFDM transmitters, for example. It will be appreciated that superposition of the signals may be done in the digital domain, using baseband signals or on intermediate frequencies, or in the analog domain, before or after power amplifiers, or over the air, i.e., by transmitting the two (or more signals) from different antennas.

Receiver Using Known Relation Between Signal_1 and Signal_2 to Derive Synch

Because the symbols in the two (or more signals) are aligned on a regular basis, it is possible to use timing information for one signal to derive timing parameters for the other signal. For example, in some embodiments, signal_2 may contain reference signals and/or synchronization signals that the receiver may use to determine symbol timing in signal_2. The receiver may then derive timing of symbol boundaries in signal_1, based on the symbol boundaries in signal_2. More particularly, since symbols of signal_1 are aligned with symbols of signal_2 periodically, it is possible to derive signal_1 symbol boundaries from the symbol boundaries of signal_2.

LTE and New Multicarrier Signal on Same Baseband

In some embodiments, one of the signals, e.g., signal_1, may be an LTE carrier, with a numerology according to LTE specifications. Signal_2 may be a different multicarrier signal generated using any of the previously mentioned numerologies. In this case, T would preferably be 1 millisecond, or 1/Z milliseconds, where Z is an integer.

Figure 4:
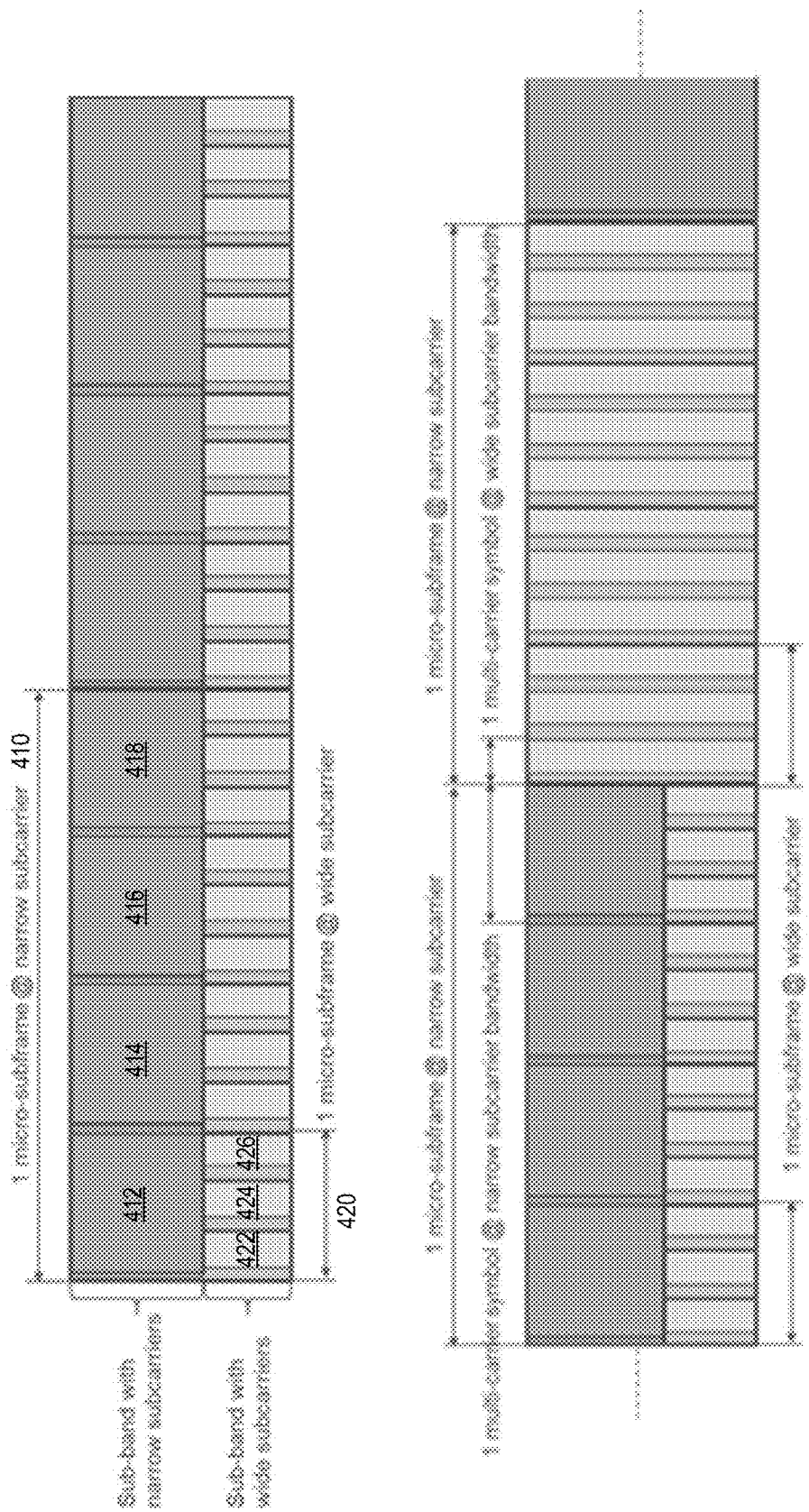
FIG. 4 illustrates multi-mode configurations, according to some embodiments.

FIG. 4 illustrates two cases of multi-mode configurations, as a non-limiting example of the presently disclosed techniques. Here, micro-subframes are defined—each micro-subframe can be equal to a few OFDM symbols. As an example, one micro-subframe 410 in FIG. 4 is shown to consist of four "long" OFDM symbols 412, 414, 416 and 418, with each of these symbols including a cyclic prefix. The new numerology allows inter-operability of different multicarrier modulation modes, characterized by different sub-carrier spacings and/or different symbol lengths. In the example illustrated in FIG. 4, one micro-subframe 410 with narrow subcarrier spacing and correspondingly long OFDM symbols 412, 414, 416, and 418, is equal to four micro-subframes 420 with wide subcarrier spacing and correspondingly short OFDM symbols 422, 424, 426, etc. Thus, the symbols are aligned, once per each larger micro-subframe.

It should be noted that while FIG. 4 illustrates examples where two multicarrier modulation modes are used, more than two modes can also be supported in a mixed mode OFDM framework. Those familiar with the details of OFDM modulators and demodulators will appreciate that the mode selection, i.e., the selection of the OFDM symbol length and the sub-carrier spacing for a given multicarrier modulation mode, can be achieved by appropriate selection of the iFFT/FFT size used to modulate and demodulate the signal, in combination with a given sample rate. In LTE, the subcarrier spacing is fixed at 15 kHz, and the symbol duration is set so that either seven symbols ("normal" cyclic prefix) or six symbols (extended cyclic prefix) fit within a 500-microsecond slot. With the approach planned for this new physical layer, a multicarrier modulation mode like (if not identical to) the OFDM modulation used in LTE can be used in a frequency band at the same time as one or more other multicarrier modulation modes having, for example, wider subcarrier spacings and shorter symbol lengths.

One of the issues with the existing LTE standard is that it uses a fixed large-sized subframe structure, which results in resource wastage for very small-sized data as is often the case in critical machine-type communication (C-MTC) scenarios. Moreover, due to relatively coarse time granularity, the LTE resource blocks simply do not meet the very low latency requirements of C-MTC applications. A second issue with the existing LTE standard is that all the different services are bound to using the same subframe structure; the subframe cannot be split among different users in order to support any emerging time-critical data services for C-MTC applications.

Both of these issues are addressed by the multi-mode techniques detailed herein. C-MTC applications can be serviced with, for example, a multicarrier modulation mode having a relatively wide subcarrier spacing and relatively short OFDM symbol lengths, e.g., as compared to those used in LTE. This, in turn, facilitates communication with these applications using relatively shorter micro-subframes, such as the micro-subframes 420 shown in FIG. 4. At the same time, mobile broadband (MBB) applications can be served with a separate multicarrier modulation mode having a relatively narrower subcarrier spacing and relatively longer OFDM symbol lengths.

It should be understood that Orthogonal Frequency-Division Multiplexing (OFDM) is but one example of a multicarrier modulation technique. Other examples include discrete-Fourier-transform-spread (DFT-spread or DFTS-) OFDM, which is also referred to single-carrier frequency-division multiple access (SC-FDMA) or precoded OFDM. Still other examples include filter-bank multicarrier (FBMC) modulation, pre-coded FBMC, and Generalized Frequency-Division Multiplexing (GFDM). Those familiar with these techniques will recognize that the digital signal processing for each of these techniques will vary, but should appreciate that any one or more of these multicarrier modulation techniques may be employed in the multi-mode schemes detailed herein—accordingly, where example embodiments are described herein in terms of OFDM, the described techniques and apparatus may employ one or more other multicarrier modulation techniques in addition to or instead of OFDM.

Figure 5:
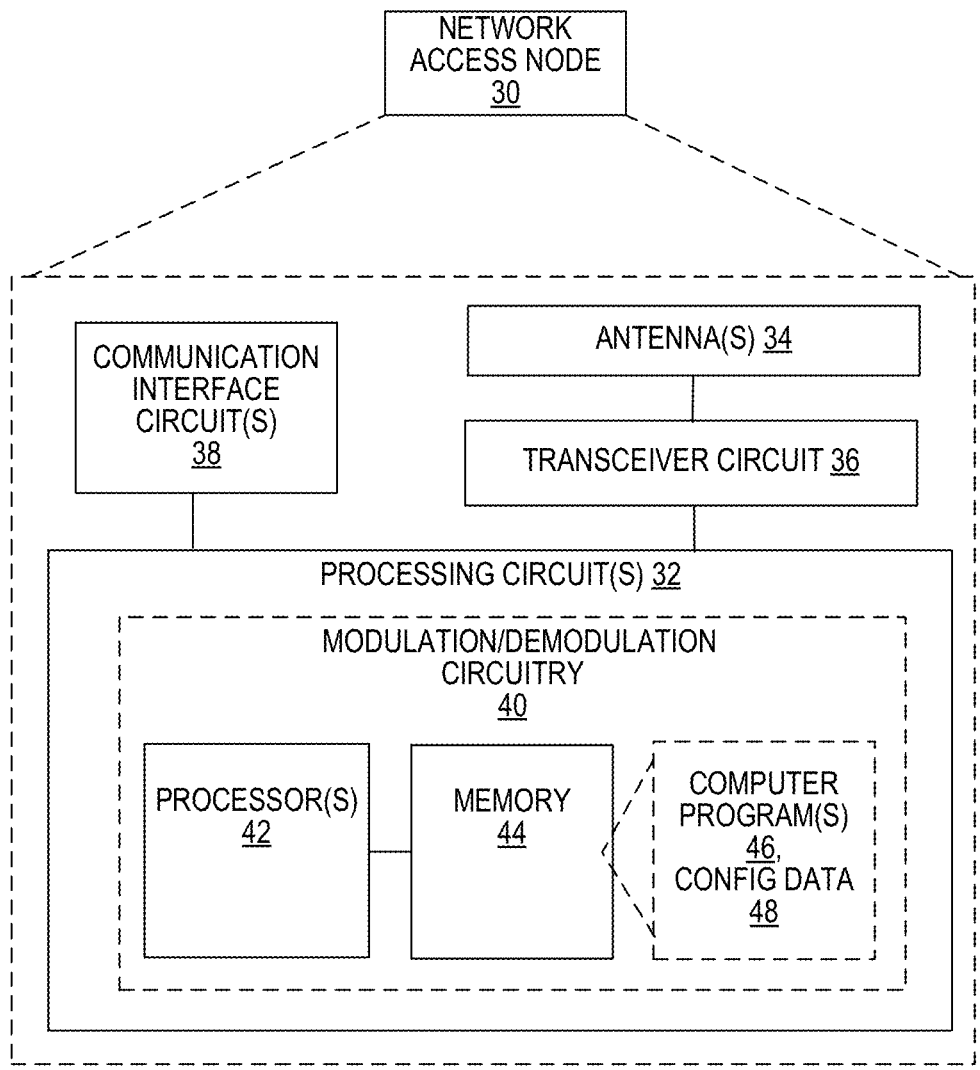
FIG. 5 illustrates a block diagram of a network access node, according to some embodiments.

FIG. 5 illustrates a diagram of a network access node 30, such as a base station, according to some embodiments. The network node 30 facilitates communication between wireless devices and the core network. The network access node 30 includes a communication interface circuit 38 includes circuitry for communicating with other nodes in the core network, radio nodes, and/or other types of nodes in the network for the purposes of providing data and cellular communication services. The network access node 30 communicates with wireless devices via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services.

The network access node 30 also includes one or more processing circuits 32 that are operatively associated with the communication interface circuit 38 or transceiver circuit 36. The network access node 30 uses the communication interface circuit 38 to communicate with network nodes and the transceiver 36 to communicate with user equipments. For ease of discussion, the one or more processing circuits 32 are referred to hereafter as "the processing circuit 32." The processing circuit 32 comprises one or more digital processors 42, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 42 may be multicore, i.e., having two or more processor cores utilized for enhanced performance, reduced power consumption, and more efficient simultaneous processing of multiple tasks.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32.

In general, the memory 44 comprises one or more types of computer-readable storage media providing non-transitory storage of the computer program 46 and any configuration data 48 used by the network access node 30. Here, "non-transitory" means permanent, semi-permanent, or at least temporarily persistent storage and encompasses both long-term storage in non-volatile memory and storage in working memory, e.g., for program execution.

Processing circuitry 32, whether alone or in combination with other digital hardware, is configured to perform multicarrier modulation techniques (for network access node 30 acting as a transmitter node), as described herein, and/or one or more multicarrier demodulation techniques (for network access node 30 acting as a receiver node), as described herein. An example modulation technique is shown in FIG. 6.

Figure 6:
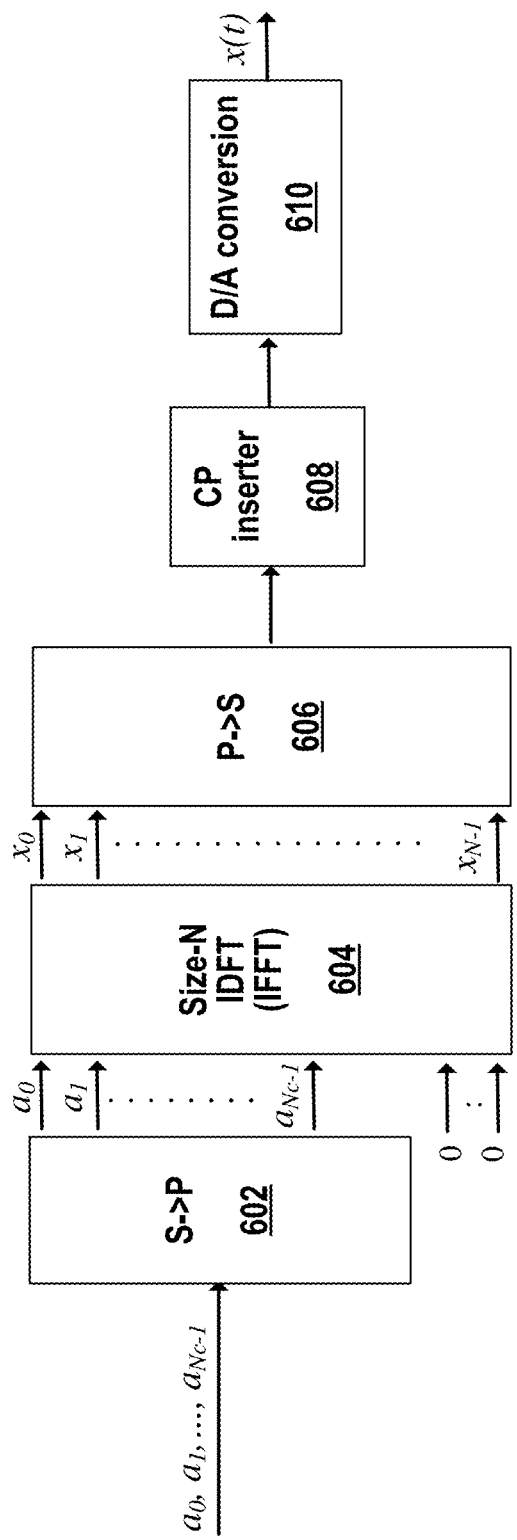
FIG. 6 illustrates a block diagram of an OFDM modulation scheme that can be used in some embodiments.

FIG. 6 illustrates OFDM modulation using an Inverse Fast Fourier Transform (IFFT) or, more generally, and Inverse Discrete Fourier Transform (IDFT). As will be explained in further detail below, two or more simultaneous instantiations of the signal processing configuration shown in FIG. 6 can be used for multi-mode operation. As indicated by the diagrams of FIG. 4, the number of OFDM subcarriers $N_c$ and the subcarrier spacing can vary. The number of subcarriers $N_c$ can range from fewer than a hundred to several thousand, depending on the subcarrier spacing that is selected and the overall transmission bandwidth.

As illustrated by FIG. 6, during each OFDM time interval, $N_c$ modulated symbols $a_0$ to $a_{N_c-1}$ are provided to the size-N IDFT 604 by the serial to parallel converter 602. The IFFT size corresponds to the total number of subcarriers that may be generated; the actual number of generated subcarriers is $N_c$ in FIG. 6.

The parallel output of IDFT 604 is converted to a serial time sequence by parallel-to-serial converter 606. Cyclic prefix inserter 608 inserts a copy of part of the OFDM symbol at the beginning of the OFDM symbol, to make the OFDM signal less sensitive to time dispersion. Following the digital to analog conversion by converter 610, the final output signal x(t) is then prepared for transmission.

Figure 7:
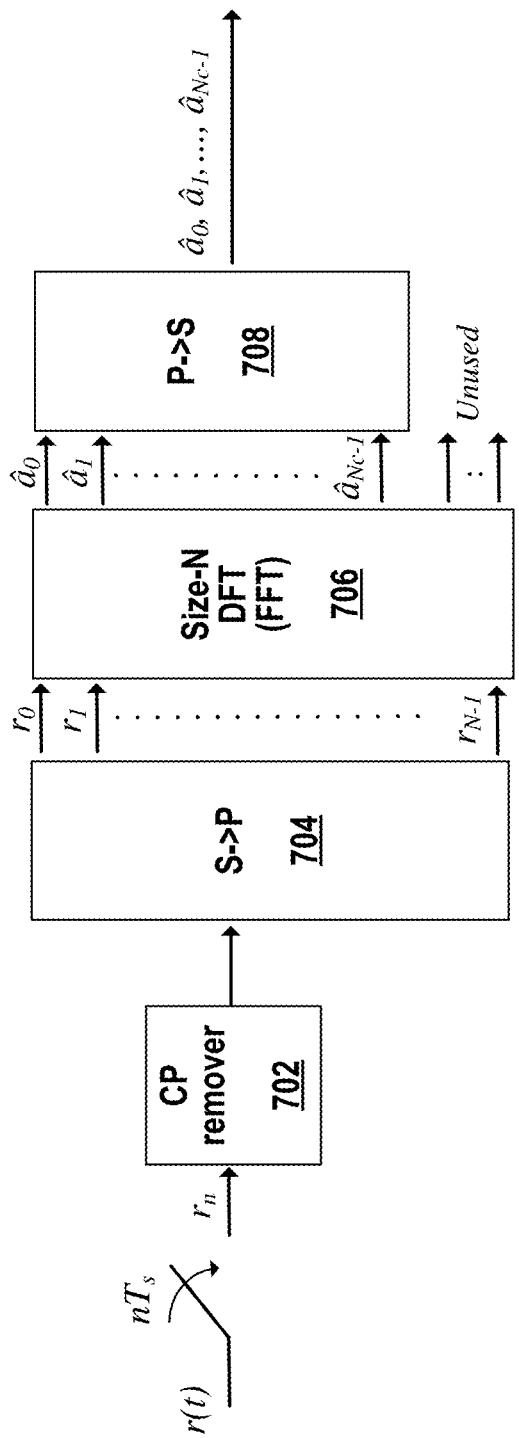
FIG. 7 illustrates a block diagram of an OFDM demodulation scheme that can be used in some embodiments.

FIG. 7 illustrates demodulation using FFT processing or, more generally, DFT processing. The received signal r(t) is sampled, and has its cyclic prefix removed by CP remover 702. The serial to parallel converter 704 provides the samples of the OFDM symbol to the size-N DFT 706, which extracts the data symbol values from the multiple subcarriers of the modulated signal. These data symbols are then converted to a serial stream of data symbols by parallel-to-serial converter 708. These data symbols are then individually demodulated and the resulting data is decoded.

Figure 8:
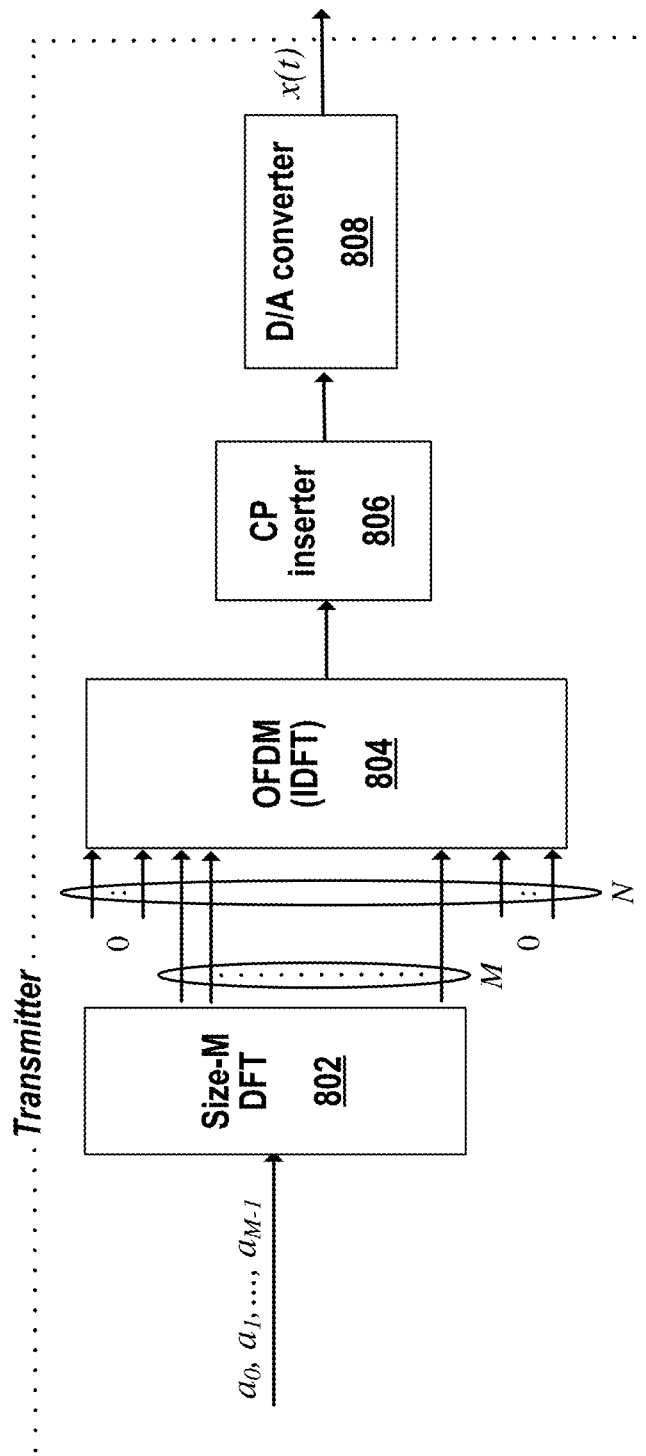
FIG. 8 illustrates a block diagram of a DFTS-OFDM modulation scheme that can be used in some embodiments.

FIG. 8 illustrates OFDM modulation with DFT-based precoding, or DFT-Spread OFDM (DFTS-OFDM), which can be referred to as single-carrier frequency division multiple access (SC-FDMA). A block of M modulation symbols is applied to Size-M DFT 802. The output of the DFT 802 is then applied to inputs of an OFDM modulator 804 that is implemented as a size-N IDFT; each input of the OFDM modulator 804 corresponds to a subcarrier of the resulting modulated signal. After conversion of the IDFT output to a time sequence in OFDM modulator 804, cyclic prefix inserter 806 inserts a cyclic prefix. Finally, output signal x(t) is output following conversion by digital-to-analog converter 808.

Figure 9:
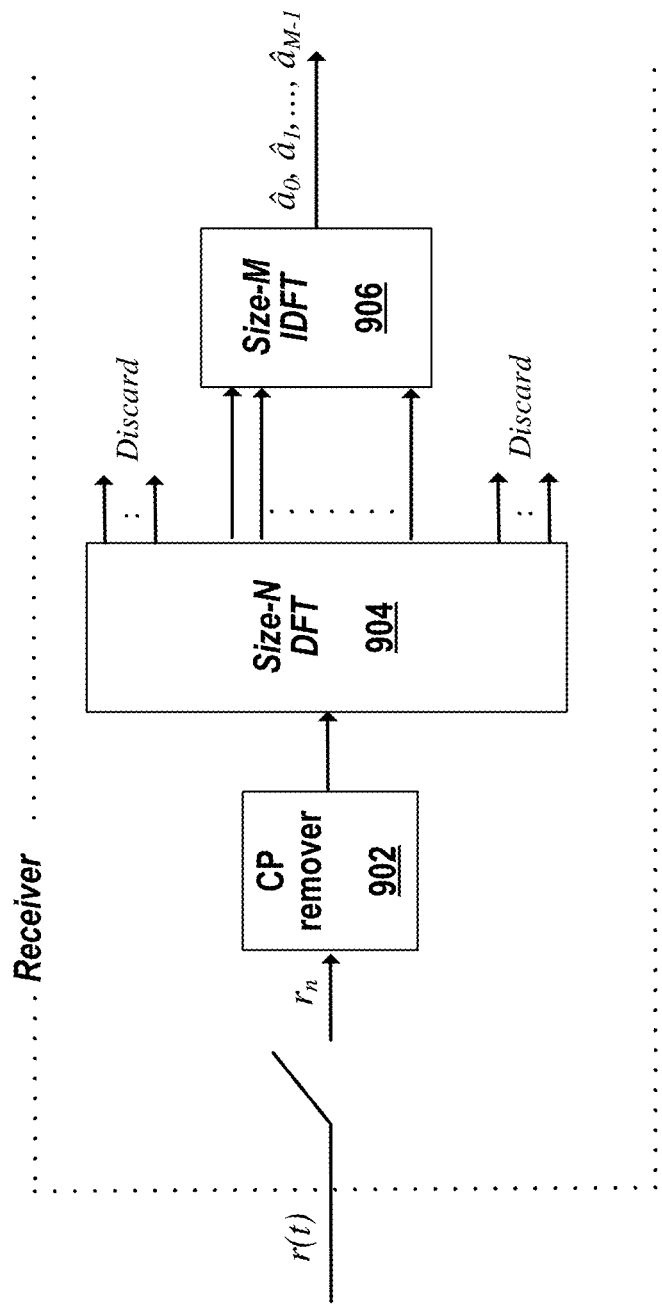
FIG. 9 illustrates a block diagram of a DFTS-OFDM demodulation scheme that can be used in some embodiments.

FIG. 9 illustrates DFTS-OFDM demodulation where a received signal r(t) is processed by cyclic prefix remover 902, Size-N DFT 904 and Size-M IDFT 906. It will be appreciated that the DFTS-OFDM demodulator shown in FIG. 9 is similar to the OFDM demodulator of FIG. 7, but with the size-M IDFT 906 added.

As previously mentioned, although OFDM and DFTS-OFDM are described as example multicarrier modulation/demodulation techniques, the embodiments of the present invention are not limited to such techniques. Also, it is noted that equalization (which may be done in the frequency domain) is omitted from the figures for simplicity.

The IFFT size can be selected for modulation schemes with different numerologies, or variants of transmission parameters. The resulting allocations can provide for symbols with different subcarrier spacings in different frequency band portions of the same time interval. For example, FIG. 10 shows two simultaneously applied multicarrier modulators 1002 and 1004. Modulator 1002 operates with an IFFT size of 2048, and is capable of outputting 2048 relatively narrow modulated subcarriers, while modulator 1004 operates with an IFFT size of 512. Modulator 1004 produces up to 512 subcarriers that are four times as wide as those from modulator 1002, while also producing symbols that are one-fourth the length.

In the illustrated example, subcarriers 400-1000 of modulator 1002 are generated, each having a bandwidth of 16.875 kHz, while the subcarriers 280-400 from modulator 1004 each have a bandwidth of 67.5 kHz. It will be appreciated that the ranges of inputs used in modulators 1002 and 1004 are selected so that the resulting subcarriers do not land on each other. In the illustrated example, the 121 relatively wide subcarriers from modulator 1004 correspond to the portion of the spectrum that would be occupied by subcarriers 1120-1600 of modulator 1002. The corresponding inputs of modulator are thus not used. This provides a small gap, in the frequency domain, between the outputs from the two multicarrier modulators, which means that the two modulated signals can simply be added to one another, in the time domain, before transmission. The result is that in a given time interval, modulation scheme 1002 provides longer blocks of symbols for a first non-overlapping portion of the frequency band, while modulation scheme 1004 provides shorter blocks of symbols in a greater number of spacings in a second non-overlapping portion of the frequency band. As a result, symbols can be directed to different receiver nodes using different subcarrier spacings, all within the same time interval. Note that these receiver nodes may be network nodes, UEs, or other wireless devices, in various embodiments.

Embodiments of the present invention provide for the use of different multicarrier modulation schemes for different portions of the frequency band. More particularly, this means that a first portion of the frequency band can contain a first signal having a first integer number of symbol intervals in each of one or more time intervals of a predetermined length, while a second portion of the band simultaneously contains a second signal having a second integer number of symbol intervals in each of the one or more time intervals of the predetermined length, the second integer number differing from the first integer number. These signals can be simultaneously transmitted in the frequency band, such that the first and second signals are frequency-domain multiplexed in the frequency band and such that a symbol interval starting time in the first signal is aligned with a corresponding symbol interval starting time in the second signal at least once per time interval.

This means that the subcarrier spacing and/or symbol durations can differ in different portions of the frequency band. While two multicarrier modulation schemes are combined in the example shown in FIG. 10, it will be appreciated that this can be extended to three, four, or more multicarrier modulation schemes, so long as non-colliding portions of the frequency band are allocated to the multiple modulators.

According to various embodiments of the techniques described herein, a transmitter node and/or a receiver node can perform communications using various combinations of the multicarrier modulation and demodulation techniques described in FIGS. 6-10, or other multicarrier modulation techniques. For example, referring back to FIG. 5, the processor 42 of the processing circuit 32 of network access node 30 may execute a computer program 46 stored in the memory 44 that configures the processor 42 to operate the network access node 30 as a transmitter node that performs multicarrier modulation. Processing circuit 32 may comprise specialized digital hardware for performing DFT/IDFT processing, in cooperation with one or more program-based processors, in some embodiments. The processor 42 is configured, for example, to form a first signal having a first integer number of symbol intervals in each of one or more time intervals of a predetermined length, and to form a second signal having a second integer number of symbol intervals in each of the one or more time intervals of the predetermined length, the second integer number differing from the first integer number. The processor 42 is further configured to control the transceiver circuit 36 to simultaneously transmit the first and second signals in a frequency band, such that the first and second signals are frequency-domain multiplexed in the frequency band and such that a symbol interval starting time in the first signal is aligned with a corresponding symbol interval starting time in the second signal at least once per time interval. This structure and functionality may be referred to as modulation/demodulation circuitry 40 in the processing circuit 32.

Figure 11:
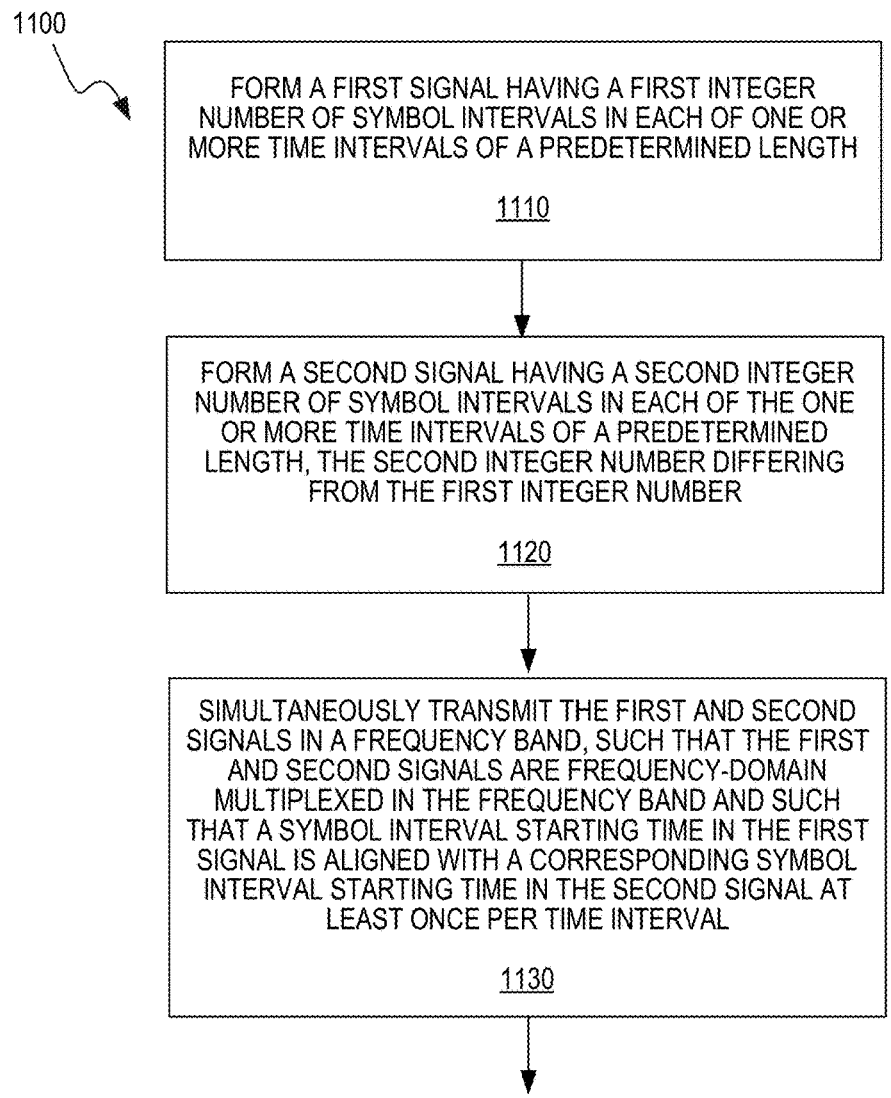
FIG. 11 illustrates a method in a transmitter node for multicarrier modulation, according to some embodiments.

FIG. 11 illustrates an example method 1100 for transmitting a multi-mode signal, such as might be implemented by the processing circuit 32 in FIG. 10. Method 1100 includes, as shown at block 1110, forming a first signal having a first integer number of symbol intervals in each of one or more time intervals of a predetermined length. As shown at block 1120, the method further includes forming a second signal having a second integer number of symbol intervals in each of the one or more time intervals of the predetermined length, the second integer number differing from the first integer number. Finally, as shown at block 1130, the method includes simultaneously transmitting the first and second signals in a frequency band, such that the first and second signals are frequency-domain multiplexed in the frequency band and such that a symbol interval starting time in the first signal is aligned with a corresponding symbol interval starting time in the second signal at least once per time interval.

In some embodiments of the illustrated method, the first and second signals have first and second subcarrier spacings, respectively, the first and second subcarrier spacings differing from one another. In some of these and in some other embodiments, each symbol interval in the first signal comprises a symbol duration and a cyclic prefix duration, the cyclic prefix duration and the symbol duration each being constant among the symbol intervals. In other embodiments, each symbol interval in the first signal comprises a symbol duration and a cyclic prefix duration, the cyclic prefix duration varying among the symbol intervals according to a predetermined pattern. As noted above, in some embodiments, one of the first and second signals may be an LTE signal.

In some embodiments, the predetermined length of the one or more time intervals is 1/Z milliseconds, where Z is an integer. In some embodiments, each symbol interval in the first signal comprises a first symbol duration and each symbol interval in the second signal comprises a second symbol duration, differing from the first symbol duration, and the first and second symbol durations are each integer multiples of a sampling interval of 1/(34.56 MHz), i.e., 1/34.56 microseconds. In some embodiments, these integer multiples are each powers of two.

In some embodiments, one or both of the first and second signals comprises a reference signal sequence having a periodicity equal to the predetermined length of the time intervals. In some of these and in some other embodiments, one or both of the first and second signals comprises a synchronization signal having a periodicity equal to the predetermined length of the time intervals, or equal to an integer multiple of the predetermined length of the time intervals.

In some embodiments, the transmitting illustrated at block 1130 of FIG. 11 is performed during one or more transmit intervals of a time-division-duplexing (TDD) scheme, where switching between transmit intervals and receive intervals of the TDD scheme is performed only at switching times separated by an integer number of the time intervals of the predetermined length.

In some embodiments of the method shown in FIG. 11, forming each of the first and second signals comprises padding a sequence of data samples with zeroes to match a predetermined Inverse-fast-Fourier Transform (IFFT) length, performing an IFFT on the padded sequence of data samples, and filtering the output of the IFFT with a pulse-shaping filter. The pulse-shaping filter outputs for the first and second signals are then combined. The padding in these embodiments is performed in such a way that the IFFT outputs for the first and second signals are multiplexed in the frequency domain. In some of these embodiments, forming each of the first and second signals comprises performing a fast-Fourier Transform (FFT) on a series of sample values to obtain the sequence of data samples, and the padding referred to above comprises concatenating the sequence of data samples with preceding zeroes or succeeding zeroes, or both, in such a way that the IFFT outputs for the first and second signals do not overlap in the frequency domain.

Referring once again to FIG. 5, the processor 42 of the processing circuit 32 may execute a computer program 46 stored in the memory 44 that configures the processor 42 to operate the network access node as a receiver node that performs receiving and demodulation of a multi-mode multicarrier signal as described herein. The processor 42 is thus configured to, for example: receive a radio frequency signal in a frequency band, using transceiver 36; recover, from the received radio frequency signal, a first signal having a first integer number of symbol intervals in each of one or more time intervals of a predetermined length; and recover, from the received radio frequency signal, a second signal having a second integer number of symbol intervals in each of the one or more time intervals of the predetermined length, the second integer number differing from the first integer number; where the first and second signals are frequency-domain multiplexed in the frequency band and overlap in time by at least one of the time intervals, and wherein a symbol interval starting time in the first signal is aligned with a corresponding symbol interval starting time in the second signal at least once per time interval. This structure and functionality may also be referred to as or be a part of modulation/demodulation circuitry 40 in the processing circuit 32.

Figure 12:
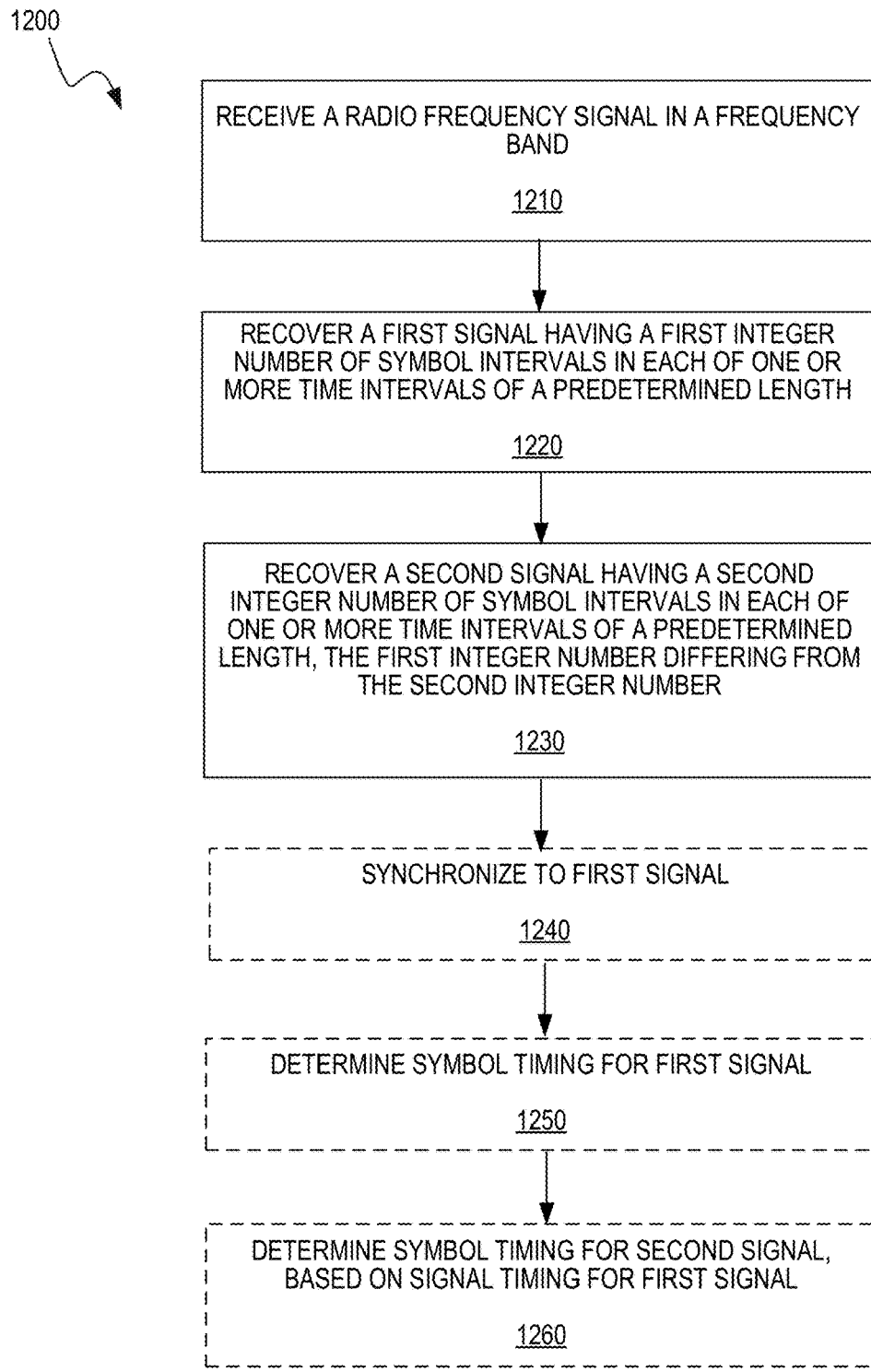
FIG. 12 illustrates a method in a receiver node for multicarrier demodulation, according to some embodiments.

FIG. 12 illustrates an example method 1200 for receiving and demodulating a multi-mode signal, such as might be implemented by the processing circuit 32 in FIG. 10. Method 1200 includes, as shown at block 1210, receiving a radio frequency signal in a frequency band. As shown at block 1220, the method further comprises recovering, from the received radio frequency signal, a first signal having a first integer number of symbol intervals in each of one or more time intervals of a predetermined length. Finally, as shown at block 1230, the method includes recovering, from the received radio frequency signal, a second signal having a second integer number of symbol intervals in each of the one or more time intervals of the predetermined length, the second integer number differing from the first integer number. In the illustrated method, the first and second signals are frequency-domain multiplexed in the frequency band and overlap in time by at least one of the time intervals, and a symbol interval starting time in the first signal is aligned with a corresponding symbol interval starting time in the second signal at least once per time interval.

In some embodiments, the method further comprises synchronizing to the first signal using a synchronization signal included in the first signal, determining symbol timing for the first signal, based on said synchronizing, determining symbol timing for the second signal, based on the symbol timing for the first signal. These operations are shown at blocks 1240, 1250, and 1260 of FIG. 12.

The network access node 30 may be referred to as a node, network node or a radio network node. Network access node 30 can be any kind of network access node that may include a base station, radio base station, base transceiver station, evolved Node B (eNodeB), Node B, relay node, access point, wireless access point, radio access point, UltraDense Network (UDN)/Software Defined Network (SDN) radio access node, Remote Radio Unit (RRU), Remote Radio Head (RRH), etc.

Figure 13:
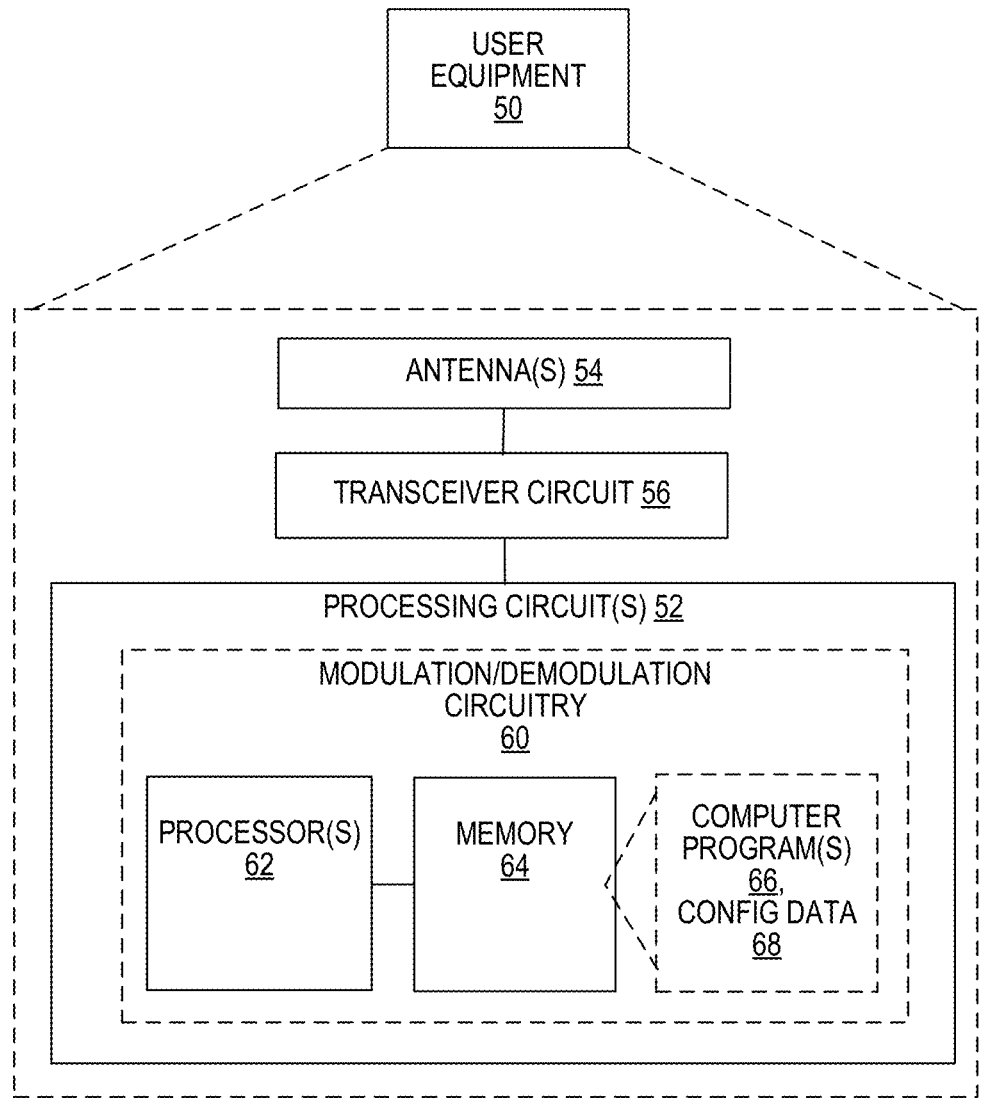
FIG. 13 illustrates a block diagram of a user equipment, according to some embodiments.

FIG. 13 illustrates a diagram of a wireless device, such as a user equipment 50, according to some embodiments. To ease explanation, the user equipment 50 may also be considered to represent any wireless devices that may operate in a network. The UE 50 herein can be any type of wireless device capable of communicating with network node or another UE over radio signals. The UE 50 may also be radio communication device, target device, device to device (D2D) UE, machine type UE or UE capable of machine to machine communication (M2M), a sensor equipped with UE, PDA (personal digital assistant), Tablet, mobile terminals, smart phone, laptop embedded equipped (LEE), laptop mounted equipment (LME), USB dongles, Customer Premises Equipment (CPE), etc.

The UE 50 communicates with a radio node or base station, such as network access node 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services.

The UE 50 also includes one or more processing circuits 52 that are operatively associated with the radio transceiver circuit 56. The processing circuit 52 comprises one or more digital processing circuits, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

The UE 50, e.g. using modulation/demodulation circuitry 60, may be configured to perform at least the modulation and demodulation techniques illustrated in FIGS. 4-12. For example, the processor 62 of the processor circuit 52 may execute a computer program 66 stored in the memory 64 that configures the processor 62 to operate as a transmitter node, as explained above for processor 42 of the network access node 30. This functionality may be performed by modulation/demodulation circuitry 60 in processing circuit 52. The processing circuit 52 of the UE 50 may thus be configured to perform a method for multicarrier modulation, such as method 1100 of FIG. 11, and the several variants of that method described above.

The processor 62 of the processor circuit 52 may execute a computer program 66 stored in the memory 64 that configures the processor 62 to operate the user equipment node 50 as a receiver node, as explained above for processor 42 of the network access node 30. This functionality may be performed by modulation/demodulation circuitry 60 in processing circuit 52. The processing circuit 52 of the UE may thus be configured to perform a method for multicarrier demodulation, such as method 1200 of FIG. 12, as described below, and variations thereof.

In some cases, a transmitter node, such as network access node 30, may be configured to operate with both such modulation and demodulation techniques, while a receiver node, such as UE 50, is merely able to receive and demodulate the symbols intended for it, according to only a single multicarrier modulation technique.

Figure 14:
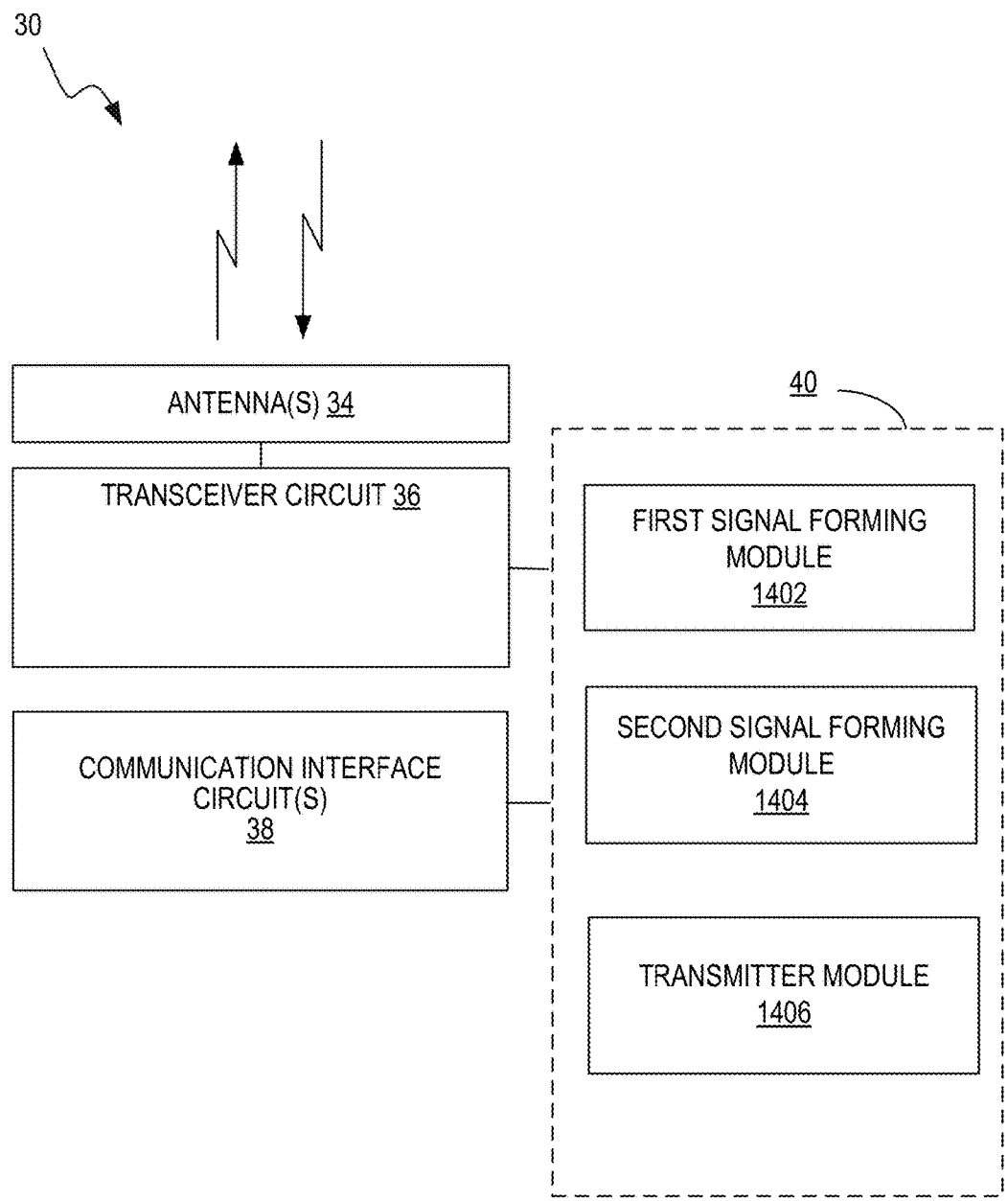
FIG. 14 illustrates a functional implementation of a node operating as a transmitter, according to some embodiments.

FIG. 14 illustrates an example functional module or circuit architecture as may be implemented in a node operating as a transmitter, e.g., based on the modulation/demodulation circuitry 40 of FIG. 5 or the modulation/demodulation circuitry 60 of FIG. 13. The illustrated embodiment at least functionally includes: a first signal forming module 1402 for forming a first signal having a first integer number of symbol intervals in each of one or more time intervals of a predetermined length; a second signal forming module 1404 for forming a second signal having a second integer number of symbol intervals in each of the one or more time intervals of the predetermined length, the second integer number differing from the first integer number; and a transmitter module 1406 for simultaneously transmitting the first and second signals in a frequency band, such that the first and second signals are frequency-domain multiplexed in the frequency band and such that a symbol interval starting time in the first signal is aligned with a corresponding symbol interval starting time in the second signal at least once per time interval.

It will be appreciated that all of the several variations of FIG. 11 described above are equally applicable to the apparatus shown in FIG. 14.

Figure 15:
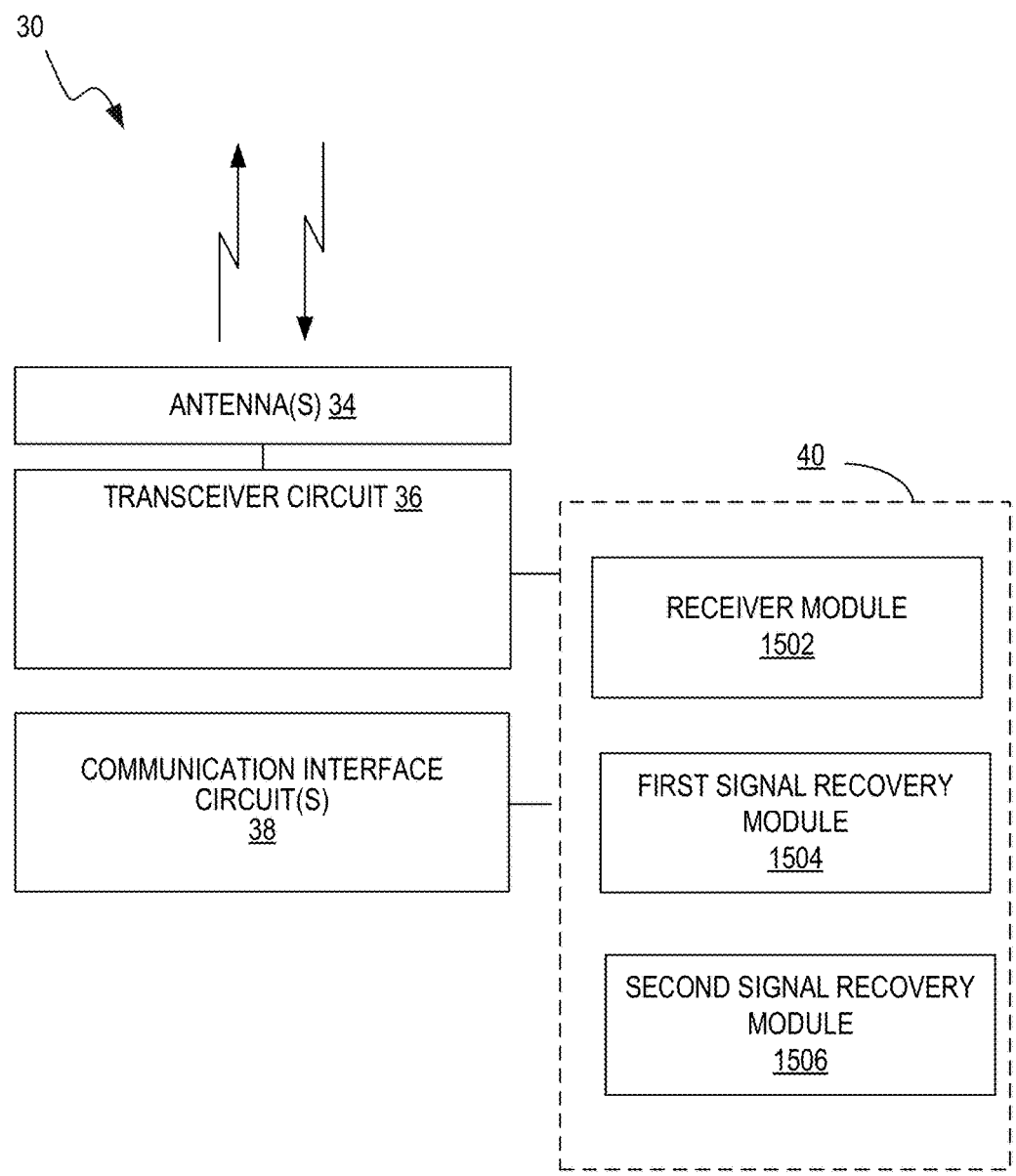
FIG. 15 illustrates a functional implementation of a node operating as a receiver, according to some embodiments.

FIG. 15 illustrates an example functional module or circuit architecture as may be implemented in a node operating as a receiver node, e.g., based on the modulation/demodulation circuitry 40 of FIG. 5 or the modulation/demodulation circuitry 60 of FIG. 13. The illustrated embodiment at least functionally includes: a receiver module 1502 configured to receive a radio frequency signal in a frequency band; a first signal recovery module 1504 for recovering, from the received radio frequency signal, a first signal having a first integer number of symbol intervals in each of one or more time intervals of a predetermined length; and a second signal recovery module 1506 for recovering, from the received radio frequency signal, a second signal having a second integer number of symbol intervals in each of the one or more time intervals of the predetermined length, the second integer number differing from the first integer number. These modules are configured to act on first and second signals that are frequency-domain multiplexed in the frequency band and overlap in time by at least one of the time intervals, and wherein a symbol interval starting time in the first signal is aligned with a corresponding symbol interval starting time in the second signal at least once per time interval.

It will be appreciated that all of the several variations of FIG. 12 described above are equally applicable to the apparatus shown in FIG. 15.

An advantage of the various techniques described herein is that they allow periodic alignment of symbols of the two or more signals in a multi-mode, multicarrier signal. This allows for time-division duplexing (TDD) operation without losing quality of any of the signals (no symbol is partly cut-off). The techniques also allow for simpler implementation of scheduling and control schemes that are coordinated across the two or more signals. The fact that periodic alignment between the symbols of the two signals occurs also simplifies synchronization algorithms at the receiver—this enables the receiver to derive starting time instants of symbols in one signal based on starting instants of symbols in another signal using a simplified process.

Notably, modifications and other embodiments of the disclosed invention(s) will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method, in a transmitting node, the method comprising:
    forming a first signal having a first integer number of contiguous symbol intervals in each of one or more time intervals of a predetermined length;
    forming a second signal having a second integer number of contiguous symbol intervals in each of the one or more time intervals of the predetermined length, the second integer number differing from the first integer number; and simultaneously transmitting the first and second signals in a frequency band, such that the first and second signals are frequency-domain multiplexed in the frequency band and such that a symbol interval starting time in the first signal is aligned with a corresponding symbol interval starting time in the second signal at least once per time interval.

2. The method of claim 1, wherein the first and second signals have first and second subcarrier spacings, respectively, the first and second subcarrier spacings differing from one another.

3. The method of claim 1, wherein each symbol interval in the first signal comprises a symbol duration and a cyclic prefix duration, the cyclic prefix duration and the symbol duration each being constant among the symbol intervals.

4. The method of claim 1, wherein each symbol interval in the first signal comprises a symbol duration and a cyclic prefix duration, the cyclic prefix duration varying among the symbol intervals according to a predetermined pattern.

5. The method of claim 1, wherein the predetermined length of the one or more time intervals is 1/Z milliseconds, where Z is an integer.

6. The method of claim 1, wherein each symbol interval in the first signal comprises a first symbol duration and each symbol interval in the second signal comprises a second symbol duration, differing from the first symbol duration, and wherein the first and second symbol durations are each integer multiples of a sampling interval of 1/34.56 microseconds.

7. The method of claim 6, wherein the integer multiples are each powers of two.

8. The method of claim 1, wherein one or both of the first and second signals comprises a reference signal sequence having a periodicity equal to the predetermined length of the time intervals.

9. The method of claim 1, wherein one or both of the first and second signals comprises a synchronization signal having a periodicity equal to an integer multiple of the predetermined length of the time intervals.

10. The method of claim 1, wherein said transmitting is performed during one or more transmit intervals of a time-division-duplexing (TDD) scheme, wherein switching between transmit intervals and receive intervals of the TDD scheme is performed only at switching times separated by an integer number of the time intervals of the predetermined length.

11. The method of claim 1:
wherein forming each of the first and second signals comprises padding a sequence of data samples with zeroes to match a predetermined Inverse-fast-Fourier Transform (IFFT) length, performing an IFFT on the padded sequence of data samples, and filtering the output of the IFFT with a pulse-shaping filter;
wherein said padding is performed so that the IFFT outputs for the first and second signals are multiplexed in the frequency domain; and
wherein the method further comprises combining the pulse-shaping filter outputs for the first and second signals.

12. The method of claim 11, wherein forming each of the first and second signals comprises performing a fast-Fourier Transform (FFT) on a series of sample values to obtain the sequence of data samples, and wherein said padding comprises concatenating the sequence of data samples with preceding zeroes or succeeding zeroes, or both, in such a way that the IFFT outputs for the first and second signals do not overlap in the frequency domain.

13. The method of claim 1, wherein either the first signal or second signal is a Long-Term Evolution (LTE) signal.

14. A method, in a receiving node, the method comprising:
receiving a radio frequency signal in a frequency band;
recovering, from the received radio frequency signal, a first signal having a first integer number of contiguous symbol intervals in each of one or more time intervals of a predetermined length; and
recovering, from the received radio frequency signal, a second signal having a second integer number of contiguous symbol intervals in each of the one or more time intervals of the predetermined length, the second integer number differing from the first integer number;
wherein the first and second signals are frequency-domain multiplexed in the frequency band and overlap in time by at least one of the time intervals, and wherein a symbol interval starting time in the first signal is aligned with a corresponding symbol interval starting time in the second signal at least once per time interval.

15. The method of claim 14, further comprising:
synchronizing to the first signal using a synchronization signal included in the first signal; and
determining symbol timing for the first signal, based on said synchronizing; and
determining symbol timing for the second signal, based on the symbol timing for the first signal.

16. A wireless transmitter comprising:
a processing circuit configured to form a first signal having a first integer number of contiguous symbol intervals in each of one or more time intervals of a predetermined length, to form a second signal having a second integer number of contiguous symbol intervals in each of the one or more time intervals of the predetermined length, the second integer number differing from the first integer number, and to combine the first and second signals such that the first and second signals are frequency-domain multiplexed in the frequency band and such that a symbol interval starting time in the first signal is aligned with a corresponding symbol interval starting time in the second signal at least once per time interval; and
a radio transceiver circuit configured to transmit the combined first and second signals in a frequency band.

17. The wireless transmitter of claim 16, wherein the processing circuit is configured to form the first and second signals so as to have first and second subcarrier spacings, respectively, the first and second subcarrier spacings differing from one another.

18. The wireless transmitter of claim 16, wherein the processing circuit is configured to form the first and second signals such that each symbol interval in the first signal comprises a symbol duration and a cyclic prefix duration, the cyclic prefix duration and the symbol duration each being constant among the symbol intervals.

19. The wireless transmitter of claim 16, wherein the processing circuit is configured to form the first and second signals such that each symbol interval in the first signal comprises a symbol duration and a cyclic prefix duration, the cyclic prefix duration varying among the symbol intervals according to a predetermined pattern.

20. The wireless transmitter of claim 16, wherein the predetermined length of the one or more time intervals is 1/Z milliseconds, where Z is an integer.

21. The wireless transmitter of claim 16, wherein the processing circuit is configured to form the first and second signals such that each symbol interval in the first signal comprises a first symbol duration and each symbol interval in the second signal comprises a second symbol duration, differing from the first symbol duration, and wherein the first and second symbol durations are each integer multiples of a sampling interval of 1/34.56 microseconds.

22. The wireless transmitter of claim 21, wherein the integer multiples are each powers of two.

23. The wireless transmitter of claim 16, wherein the processing circuit is configured to form the first and second signals such that one or both of the first and second signals comprises a reference signal sequence having a periodicity equal to the predetermined length of the time intervals.

24. The wireless transmitter of claim 16, wherein the processing circuit is configured to form the first and second signals such that one or both of the first and second signals comprises a synchronization signal having a periodicity equal to an integer multiple of the predetermined length of the time intervals.

25. The wireless transmitter of claim 16, wherein the processing circuit is configured to control the radio transceiver circuit to transmit during one or more transmit intervals of a time-division-duplexing (TDD) scheme, wherein switching between transmit intervals and receive intervals of the TDD scheme is performed only at switching times separated by an integer number of the time intervals of the predetermined length.

26. The wireless transmitter of claim 16:
wherein the processing circuit is configured to form each of the first and second signals by padding a sequence of data samples with zeroes to match a predetermined Inverse-fast-Fourier Transform (IFFT) length, performing an IFFT on the padded sequence of data samples, and filtering the output of the IFFT with a pulse-shaping filter;
wherein the processing circuit is configured to perform the padding such that the IFFT outputs for the first and second signals are multiplexed in the frequency domain; and
wherein the processing circuit is further configured to combine the pulse-shaping filter outputs for the first and second signals.

27. The wireless transmitter of claim 26, wherein the processing circuit is configured to perform a fast-Fourier Transform (FFT) on a series of sample values to obtain the sequence of data samples, and to perform the padding by concatenating the sequence of data samples with preceding zeroes or succeeding zeroes, or both, in such a way that the IFFT outputs for the first and second signals do not overlap in the frequency domain.

28. The wireless transmitter of claim 16, wherein either the first signal or second signal is a Long-Term Evolution (LTE) signal.

29. A wireless receiver comprising:
a radio transceiver circuit configured to receive a radio frequency signal in a frequency band; and
a processing circuit configured to recover, from the received radio frequency signal, a first signal having a first integer number of contiguous symbol intervals in each of one or more time intervals of a predetermined length and a second signal having a second integer number of contiguous symbol intervals in each of the one or more time intervals of the predetermined length, the second integer number differing from the first integer number;
wherein the first and second signals are frequency-domain multiplexed in the frequency band and overlap in time by at least one of the time intervals, and wherein a symbol interval starting time in the first signal is aligned with a corresponding symbol interval starting time in the second signal at least once per time interval.

30. The wireless receiver of claim 29, wherein the processing circuit is further adapted to:
synchronize the wireless receiver to the first signal using a synchronization signal included in the first signal;
determine symbol timing for the first signal, based on said synchronizing; and
determine symbol timing for the second signal, based on the symbol timing for the first signal.

* * * * *